No. 752,503. PATENTED FEB. 16, 1904.
W. H. ZIMMERMAN.
COMBINED HOOD AND COOKING UTENSIL.
APPLICATION FILED APR. 4, 1903.
NO MODEL.
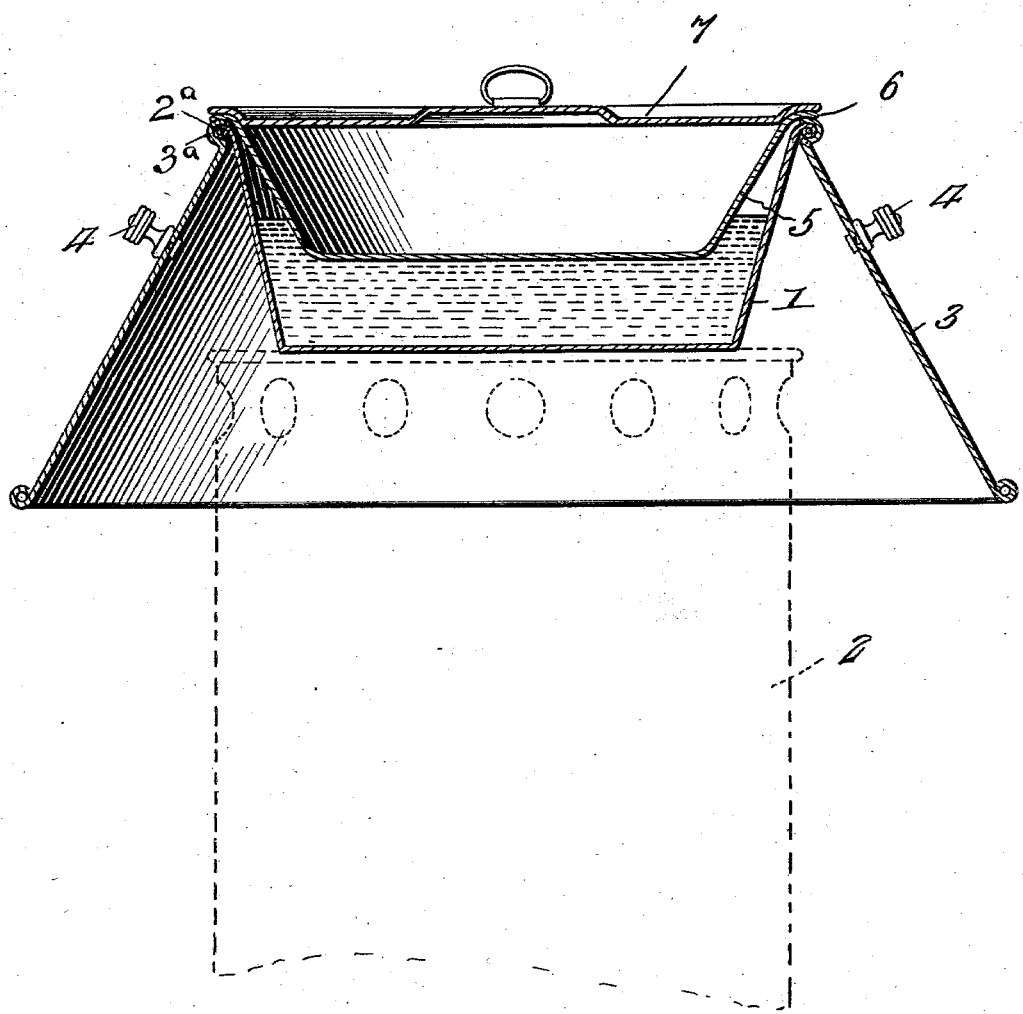
Witnesses
Wm Koerth
Chas. S. Hyer.
Inventor
William H. Zimmerman,
By Victor J. Evans
Attorney.
THE NORRIS PETERS CO., PHOTO-LITHO., WASHINGTON, D. C.

No. 752,503. Patented February 16, 1904.

UNITED STATES PATENT OFFICE.

WILLIAM H. ZIMMERMAN, OF BALTIMORE, MARYLAND.

COMBINED HOOD AND COOKING UTENSIL.

SPECIFICATION forming part of Letters Patent No. 752,503, dated February 16, 1904.

Application filed April 4, 1903. Serial No. 151,150. (No model.)

*To all whom it may concern:*

Be it known that I, WILLIAM H. ZIMMERMAN, a citizen of the United States, residing at Baltimore, in the State of Maryland, have invented new and useful Improvements in a Combined Hood and Cooking Utensil, of which the following is a specification.

My invention has relation to new and useful improvements in attachments for oil and similar heating-stoves, and more especially to those devices which are employed for the purpose of causing a diffuse distribution of the heat in the apartment in which the stove is located and for moistening the heated air-currents created and also for collecting the products of combustion and preventing their dissemination in the atmosphere of the apartment.

The object of the invention is to produce a device which will be simple in construction and which will be so constructed as to be capable of use in connection with any of the well-known makes of oil or gas stoves and which will include means for holding water in order that steam may be generated for the purpose of becoming mixed with the heated air, and thereby moistening the same.

A further object is to so construct the device that it may be employed as a convenient means for cooking or for keeping victuals warm, so as to render it especially adapted for use in the sick-room.

The invention consists in providing a heat-deflecting hood, which is constructed to distribute the heat and to collect and prevent the carrying of the products of combustion into the room, said hood having secured in position thereon a water-pan, upon which the device rests when in position on the stove. A cooking vessel may also be provided, which is supported by the rim of the hood and water-pan and is heated by being placed in contact with the water in the water-pan.

I have fully and clearly illustrated the invention in the accompanying drawing, wherein the figure is a vertical central section of the invention, showing it in its operative position upon a drum of an oil-stove, said drum being shown in dotted lines.

Referring to the drawing, 1 designates a water-pan, which may be of any suitable general form and construction, the flat bottom $1^a$ of which is adapted to be seated upon the drum 2 of the stove and serve as a support for the other elements of the invention. This pan 1 is intended to be partially filled with water in order that the heat from the stove-drum 2 will generate steam in the pan, which will pass out to moisten the heated air given off by the drum. This pan may be of any desired capacity and at its upper edge is formed with an exterior circumferential bead or flange $2^a$, which is made by rolling the upper edge of the pan, as shown in the drawing.

3 designates the hood, which is employed for the purpose of distributing the heat given off by the stove and also for collecting and retaining the products of combustion. This hood is frusto-conical in general contour—that is, it flares outwardly from its upper portion toward its lower extremity—the upper edge being crimped to provide a circumferential groove or channel $3^a$, within which is seated and secured the bead or flange $2^a$, provided on the water-pan 1, which serves to secure the pan and hood together. This hood is made of such a size and depth as to have its lower edge project well below the upper portion of the heat-drum in order that all the heat will be directed into the space between the pan 1 and drum as it issues from the heater.

In order that the device may be placed in position on the heating-drum and readily removed therefrom, I provide the hood with suitable hand-knobs 4, as shown.

The invention as just described is in the form usually employed when the device is used merely as a heat-distributer and air-moistener, and it will be seen that when assembled the pan and hood form a practically integral structure, the pan serving as the base or support of the complete device. If it is desired to employ the device for cooking purposes, a pan 5 is employed, the body of which is adapted to be seated within the pan 1 in order that its contents may be heated by the water or steam in said pan. This pan 5 is supported in position by means of a circumferential flange 6, which is adapted to rest upon the upper edge of the pan 1, as shown in the drawing. A suitable cover 7 may also be provided for closing the pan 5.

From the above description it will be seen that the device is supported upon the pan 1 and that by so doing the invention may be employed in connection with almost any size of heating-drums which can be placed inside the hood 3. This will be found especially advantageous for the reason that in most devices of this character their use is limited to drums of but one size or sizes extending within small limits, which restricts the usefulness of the device.

It will be perceived that any heat given off by the drum 2 will ascend and strike the inner surface of the hood 3 where the products of combustion will strike and remain or be deflected downwardly and not be permitted to incorporate with the air-currents of the room. The heated air striking the hood will heat the same so as to render it a heating element and will then pass downwardly and out from under the hood, whence it will be distributed to a greater advantage than if permitted to immediately ascend from the drum. The heating process also generates steam within the pan 1, which ascending mixes with the heated air-currents created by the heating-drum and moistens them with an obviously beneficial result.

What I claim, and desire to secure by Letters Patent, is—

1. In a device of the character described, the combination of a receptacle formed with a flat bottom, and rolled at its upper edge to constitute a circumferential flange and an outwardly-flaring hood formed with a circumferential channel at its upper edge in which said flange is permanently secured, the said hood flaring outwardly and downwardly below the bottom of the receptacle upon which the device stands.

2. In a device of the character described the combination with a heating-drum, of a water vessel formed with a flat bottom adapted to rest upon the drum, said receptacle being formed at its upper extremity with a circumferential flange, an outwardly an downwardly flaring hood formed at its upper extremity with a circumferential channel in which said flange is permanently held, the lower edge of the hood extending below the lower edge of the receptacle and to a point intermediate the ends of the heating-drum.

3. In a device of the character described, the combination with a heating-drum, of a receptacle adapted to be seated upon the top of said drum, and a downwardly and outwardly flaring hood the upper edge of which merges with the upper edge of the receptacle and the lower edge of which terminates at a point between the ends of the heating-drum.

In testimony whereof I affix my signature in presence of two witnesses.

WILLIAM H. ZIMMERMAN.

Witnesses:
S. ECKHAUS,
CHARLES F. HAILEY.